US007852962B2

United States Patent
Gu et al.

(10) Patent No.: US 7,852,962 B2
(45) Date of Patent: Dec. 14, 2010

(54) SYSTEMS AND METHODS FOR IMPLEMENTING A DATA CONTROL CHANNEL IN A WIRELESS COMMUNICATION SYSTEM

(75) Inventors: Jian Gu, Beijing (CN); Hongkui Yang, San Diego, CA (US); Linlin He, Beijing (CN)

(73) Assignee: Via Telecom Co., Ltd. (KY)

( * ) Notice: Subject to any disclaimer, the term of this patent is extended or adjusted under 35 U.S.C. 154(b) by 660 days.

(21) Appl. No.: 11/828,936

(22) Filed: Jul. 26, 2007

(65) Prior Publication Data

US 2008/0025428 A1    Jan. 31, 2008

Related U.S. Application Data

(60) Provisional application No. 60/820,727, filed on Jul. 28, 2006.

(51) Int. Cl.
*H04L 5/12*    (2006.01)
*H04L 23/02*   (2006.01)

(52) U.S. Cl. ........................ 375/265; 375/262; 375/261; 375/264; 375/279; 375/280; 714/702; 714/758; 714/756; 714/792

(58) Field of Classification Search ................ 375/259, 375/265, 262, 261, 264, 279, 280, 281, 298, 375/308; 714/702, 758, 756, 792
See application file for complete search history.

(56) References Cited

U.S. PATENT DOCUMENTS

2003/0147422 A1*  8/2003  You et al. .................... 370/468

* cited by examiner

*Primary Examiner*—Phuong Phu
(74) *Attorney, Agent, or Firm*—Baker & McKenzie LLP (57) ABSTRACT

A channel structure that can efficiently transmit more data control bits, e.g., required by future wireless communication systems, yet achieve sufficient detection and false alarm performance uses tail-biting convolutional coding and Cyclical Redundancy Check (CRC). In certain implementations, symbol repetition, interleaving and/or scrambling can also be included. Also, depending on the implementation, modulation schemes such as Bi-Phase Shift Keying (BPSK), Quadrature Phase Shift Keying (QPSK) or Quadrature Amplitude Modulation (QAM) can be used in conjunction with the other coding techniques.

20 Claims, 10 Drawing Sheets

SYSTEMS AND METHODS FOR IMPLEMENTING A DATA CONTROL CHANNEL IN A WIRELESS COMMUNICATION SYSTEM

RELATED APPLICATIONS INFORMATION

This application claims priority under 35 U.S.C. 119(e) to U.S. Provisional Patent Application Ser. No. 60/820,727, entitled "Data Control Channel In Wireless Communication Systems," filed Jul. 28, 2006, which incorporated herein in its entirety as if set forth in full.

BACKGROUND INFORMATION

1. Field

The embodiments described herein are related to wireless communication and more particular to implementation of a data control channel that provides information related to how to receive a traffic channel in a wireless communication system.

2. Background

It will be understood that in a wireless communication system certain traffic channels are used to communicate data, e.g., between a base station or wireless access point and a wireless communication device. It will also be understood that a data control channel is usually associated with a traffic channel. The data control channel is used to communicate information that allows either the base station or wireless communication device to receive and decode data on the traffic channel correctly. For example, a channel termed the preamble channel is the data control channel in systems that implement the cdma2000 Evolution Data Optimized (EV-DO) standards and protocols for the Forward link. Similarly, the Reverse Rate Indicator (RRI) channel is the data control channel in cdma2000 EV-DO systems for the reverse link. These channels are described in the 3GPP2 C.S0024-A v2.0 standard. In a Wideband Code Division Multiple Access (WCDMA) system, the High Speed-Shared Control Channel (HS-SCCH) is the data control channel in the downlink, while the Enhanced Dedicated Physical Control Channel (E-DPCCH) is the data control channel in the uplink.

Depending on the system, the data control channel can be transmitted either simultaneously with or in advance of the corresponding traffic data channel.

The term "wireless communication device" as used in this description and the claims that follow is intended to refer to any device capable of wireless communication with, e.g., a base station or wireless access point. Thus, the term "wireless communication device" includes, but is not limited to, cellular telephone type devices, also known as handsets, mobiles, mobile handsets, mobile communication devices, etc., Personal Digital Assistants (PDAs) with wireless communication capability, smartphones, computing devices with wireless communication capability including handheld computers, laptops, or even desktop computers, etc.

It will also be understood that while many of the examples and embodiments provided herein refer to Wireless Wide Area Networks (WWANs), the systems and methods described herein can also be applied to Wireless Personal Area Networks (WPANs), Wireless Local Area Networks (WLANs), Wireless Metropolitan Area Networks (WMANs), etc. It will also be understood that such networks include some type of access device or infrastructure such as a base station, e.g., in a WWAN or WMAN, or an access point, e.g., in a WLAN. It will be understood therefore that reference to these access devices/infrastructures are interchangeable and that reference to one should not exclude reference to another unless explicitly stated or where such is dictated by the context of the reference.

As noted, the information contained in the data control channel is used by the receiver to correctly receive and decode data on the traffic channel. Thus, the reliable detection of the data control channel is crucial for data reception performance; however, the data control channel must also be received and decoded correctly. Accordingly, the decoding performance for the data control channel should exceed that for other channels in order to ensure that the critical control information is received properly. It will be understood that increased performance usually requires increased resources and/or overhead. Increased overhead, however, can have a negative impact on the transmission efficiency.

In conventional systems, the number of bits that are carried by the data control channel is relatively small. In future wireless communication systems, however, the number of bits will likely increase due to the increased complexity of the system design. Even with the existing EV-DO preamble design, the forward link performance is limited by the preamble in certain radio channel conditions, such as a one-path slow fading conditions. Current system architectures with respect to the data control channel can result in large frame error rates or reduced transmission efficiency in such conditions.

For example, a cdma2000 EV-DO system uses bi-orthogonal coding for the forward link preamble. Thus, if 10 bits need to be transmitted, the data control channel, i.e., preamble in forward link, requires at least 512 symbols. Accordingly, it should be apparent that current systems impose large overhead requirements even when transmitting just a few bits of information. For example, the 512 symbols of this example will use too much of the resource, e.g., for a wireless communication device with high Channel to Interference (C/I) ratio. At the same time, however, the channel codes used in conventional data control channels are not very powerful, or the inclusion of required tail bits reduces transmission efficiency. Thus, large amount of resources are being consumed, even though somewhat limited performance gain is being provided via conventional data control channels.

SUMMARY

A channel structure that can efficiently transmit more data control bits, e.g., required by future wireless communication systems, yet achieve sufficient detection and false alarm performance uses tail-biting convolutional coding and Cyclical Redundancy Check (CRC). In certain implementations, symbol repetition, interleaving and/or scrambling can also be included. Also, depending on the implementation, modulation schemes such as Bi-Phase Shift Keying (BPSK), Quadrature Phase Shift Keying (QPSK) or Quadrature Amplitude Modulation (QAM) can be used in conjunction with the other coding techniques.

In one aspect, various transmitter designs are presented that embody the above encoding techniques. Such transmitter designs can be incorporated into uplink or downlink transmitter designs as required.

In another aspect, various methods for encoding a data control channel signal are presented that embody the various techniques described above and below.

In one embodiment, a channel encoder configured to encode information bits is disclosed. The channel encoder comprises a cyclical redundancy check encoding block, a tail-biting convolution encoder coupled with the CRC encoding block, a symbol repetition block coupled with the tail-biting convolution encoder, and a modulation block. The CRC encoding block is configured to receive the information bits, generate CRC bits based on the information bits, and add the CRC bits to the information bits forming input symbols. The tail-biting convolution encoder generates output symbols from the input symbols using a tail biting technique. The symbol repetition block repeats the output symbols. And the repeated output symbols are modulated by the modulation block.

In another embodiment, a method for encoding information bits is disclosed. The method comprises generating CRC bits based on the information bits, adding the CRC bits to the information bits forming input symbols, generating output symbols from the input symbols using a tail biting technique, repeating the output symbols, and modulating the output symbols.

In another embodiment, a wireless communication device comprising a receiver configured to receive coded signals and a transmitter configured to generate coded signals for transmission is disclosed. The transmitter comprising a channel encoder configured to encode information bits. And the channel encoder comprises a cyclical redundancy check encoding block, a tail-biting convolution encoder coupled with the CRC encoding block, a symbol repetition block coupled with the tail-biting convolution encoder, and a modulation block. The CRC encoding block is configured to receive the information bits, generate CRC bits based on the information bits, and add the CRC bits to the information bits forming input symbols. The tail-biting convolution encoder generates output symbols from the input symbols using a tail biting technique. The symbol repetition block repeats the output symbols. And the repeated output symbols are modulated by the modulation block.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which.

DETAILED DESCRIPTION OF THE PREFERRED EMBODIMENTS

The embodiments described below provide for data control channel encoding that can efficiently transmit more data control bits. The embodiments use tail-biting convolutional code and CRC coupled with, e.g., symbol repetition, interleaving and/or scrambling, and modulation schemes such as BPSK, QPSK or QAM. The embodiments described below are generally described in terms of QPSK; however, it will be understood that this does not exclude the use of other modulation techniques and is simply done for convenience.

Further, after tail-biting convolutional encoding and modulation, the modulated symbols can be further transformed according to the air interface standard being implemented, e.g., CDMA or Orthogonal Frequency Division Multiplexing (OFDM), for transmission. For example, the signal can be transformed into an OFDM subcarrier waveform, e.g., with or without multiple antennas (Multiple In Multiple Out (MIMO)) or beam-forming. Implementation of such transformations are not included for the sake of brevity and because such transformations are well known.

Implementation of the embodiments described below result in a frame structure with reduced overhead symbols, which allows for increased capability and a more efficient design. Further, such a frame structure requires lower transmission power or a lower signal to noise (Eb/N0) ratio in the receiver to achieve similar false alarm and missing detection performance as conventional solutions. Additionally, in some embodiments, it is unnecessary to make any tradeoff between false alarm rates and missing detection probabilities, because the CRC bits, as well as the information bits in certain implementations, including user information, transmission format information, and/or subcarrier or channelization code, etc., can be used to check errors. In some embodiments, the factors influencing whether the tradeoff between false alarm rates and missing detection probabilities exist include the number of CRC bits and the required false alarm rate. If the number of CRC bits are too few to provide a low false alarm rate, the tradeoff still exists.

Figure 1:
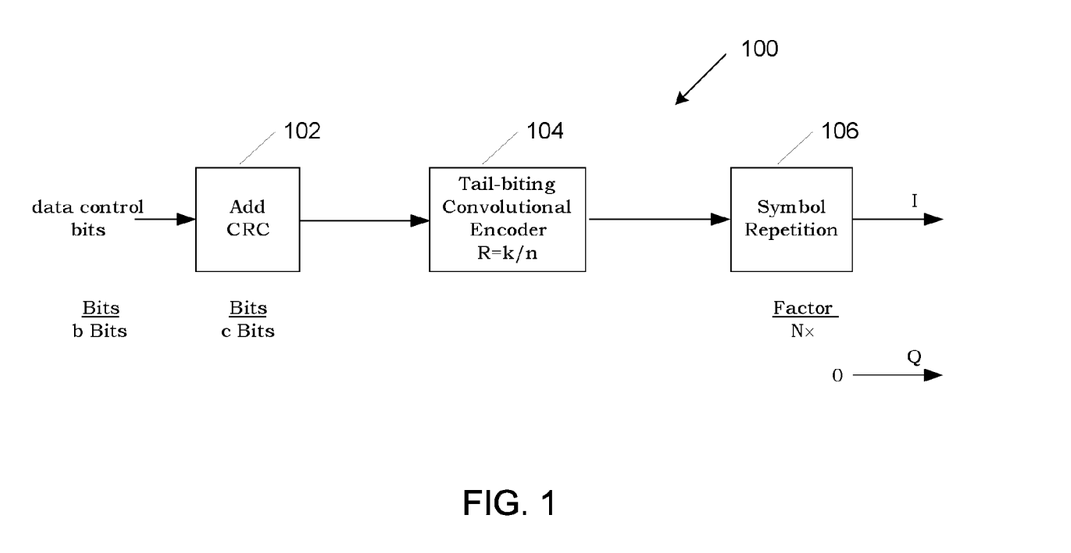
FIG. 1 is a diagram illustrating an example data control channel encoder for small transmission duration in accordance with one embodiment.

FIG. 1 is a diagram illustrating an example data control channel encoder 100 configured in accordance with one embodiment of the systems and methods described herein. The encoder 100 of FIG. 1 can be included, for example, in a forward link or reverse link transmitter in a cdma2000 EV-DO system. It will be understood that the encoder 100 of FIG. 1, as with all embodiments described herein, can be implemented in software, hardware, or some combination thereof.

As can be seen, encoder 100 comprises a CRC block 102 configured to add CRC bits (c) to a sequence of input data bits (b). CRC bits can be used for alarm or missing detection probability determination in the receiver. Further, as mentioned, the actual information bits (b) can also be used for this purpose.

The output of CRC block 102 will then comprise (b+c) bits and will be input to tail biting convolution encoder 104. As will be understood, a convolution encoder converts (k) input bits, in this case k=b+c, into a sequence of (n) bits. The n-bit sequence, or symbol, can then used to determine the k bits in the receiver. Thus, the effective rate (R) of encoder 102 is R=k/n.

It will be understood that in a conventional convolutional encoder, a tail sequence must be added to the end of the generated sequence in order to properly end the encoding process. The tail sequence is typically a series of "0's," which add to the overhead associated with the data control channel. Tail biting means that the encoder starts in the state given by the (m) last symbols of the information sequence, where m is the size of the memory, or length of the register included in the encoder. Hence, the encoder starts and ends in the same state and thus the loss in rate of the code associated with conventional convolution encoders is eliminated. In other words, the need for the tail sequence can be eliminated, which reduces overhead.

The output of tail biting convolution encoder 104 is then input to symbol repetition block 106. In practice, tail-biting convolutional encoder 104 operates on a certain number of input bits (k) and therefore creates a certain number output bits (n), or symbols. Symbol repetition block 106 can then copy and repeat the symbols a certain number of times (N). Thus, symbol repetition block 106 increases the number of bits by a factor (N). For example, if encoder 100 has a certain maximum data rate (R), but is operating at half rate (½R), then each symbol can be repeated one time so that the overall transmit data rate is still R. Such repetition can be advantageous as it reduces the required energy per symbol, which can reduce interference.

The embodiment of FIG. 1 can be used in implementations where a data control channel with small transmission duration is required or desired. In the example of FIG. 1, the output can then be modulated using QPSK; however, for backward compatibility the encoder can use BPSK, i.e., only the in-phase signal is actually transmitted. Thus, the embodiment of FIG. 1 can be backwards compatible with conventional cdma2000 EV-DO system. For example, in certain implementations the following parameters can be used: b=10 bits, c=6 bits, R=¼, N=1, 2, . . . , 16 or R=½, N=1, and encoder 100 can, e.g., be used to generate the preamble channel of a cdma2000 EV-DO system.

Figure 2:
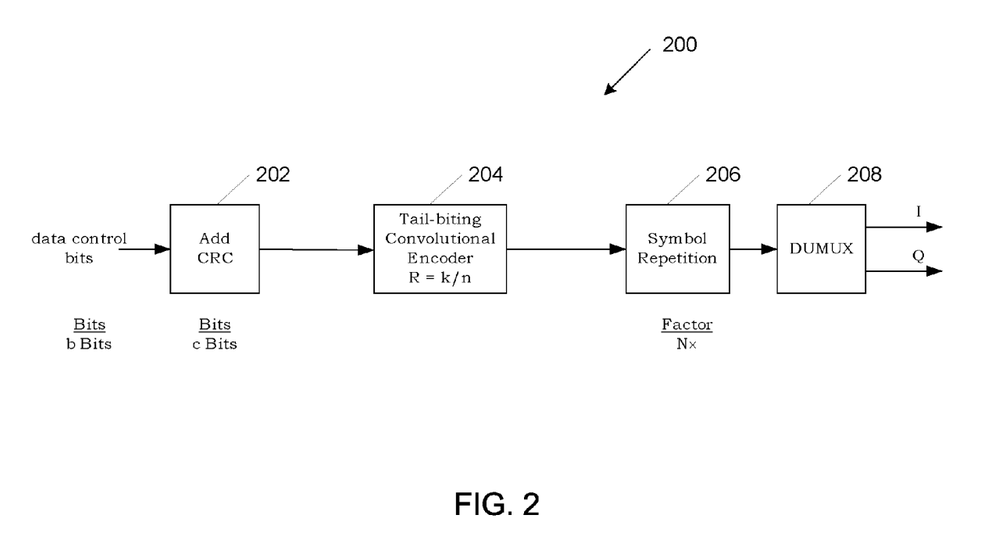
FIG. 2 is a diagram illustrating an example data control channel encoder for small transmission duration in accordance with another embodiment.

FIG. 2 is a diagram illustrating an example data control channel encoder 200 configured in accordance with another embodiment of the systems and methods described herein. The example of FIG. 2 is similar to that illustrated and described in relation to FIG. 1; however, in this embodiment, true QPSK can be used, e.g., the output of symbol repetition block 206 can then be modulated onto both in-phase and quadrature phase signals by multiplexing the output of repetition block 206 into in-phase and quadrature phase streams in multiplexer 208.

The embodiment of FIG. 2 can be used to produce a data control channel with small transmission duration. For example, a data control channel generated using encoder 200 can occupy less transmission time than one generated using encoder 100. In certain implementations, the following parameters can be used for preamble channel generation in a cdma2000 EV-DO system: b=10 bits, c=6 bits, R=¼, N=1, 2, . . . , 16 or R=½, N=1.

The embodiments described below will include many components that have already been described in relation to FIGS. 1 and 2. For the sake of brevity, the operation of each of these components will not be described for each embodiment. Accordingly, it can be assumed that such components operate in the same manner unless otherwise noted.

Figure 3:
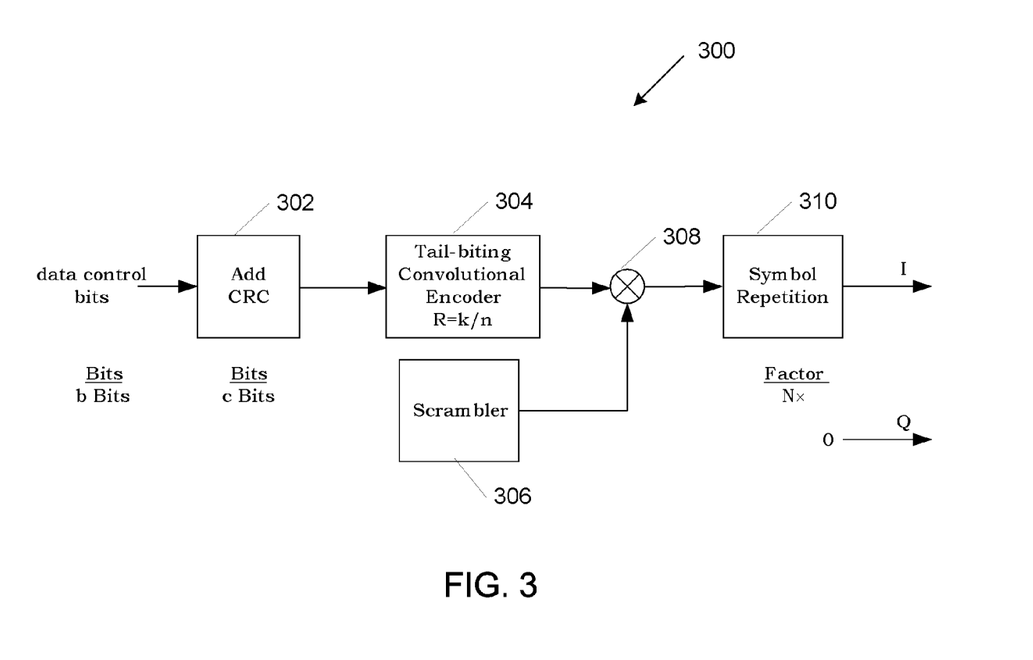
FIG. 3 is a diagram illustrating an example data control channel encoder for small transmission duration in accordance with still another embodiment.

FIG. 3 is a diagram illustrating an example data control channel encoder 300 configured in accordance with another embodiment of the systems and methods described herein. In encoder 300, the output of tail-biting convolutional encoder 304 is scrambled by combining the output with a scrambling code produced by scrambling block 306 in combiner 308. Scrambling randomizes the data bits, which can improve the peak-to-average power ratio for the transmitted signal. For example, if a long string of "1's" were to be transmitted, then the resulting peak-to-average power ratio would be high. By randomizing, or scrambling the data bits, the peak-to-average power ratio can be reduced.

The embodiment of FIG. 3 can also be used to create a data control channel with small transmission duration. As with the example of FIG. 1, the output of symbol repetition block 310 can be encoded using BPSK. Thus, the embodiment of FIG. 3 can be completely backward compatible with cdma2000 EV-DO system.

Figure 4:
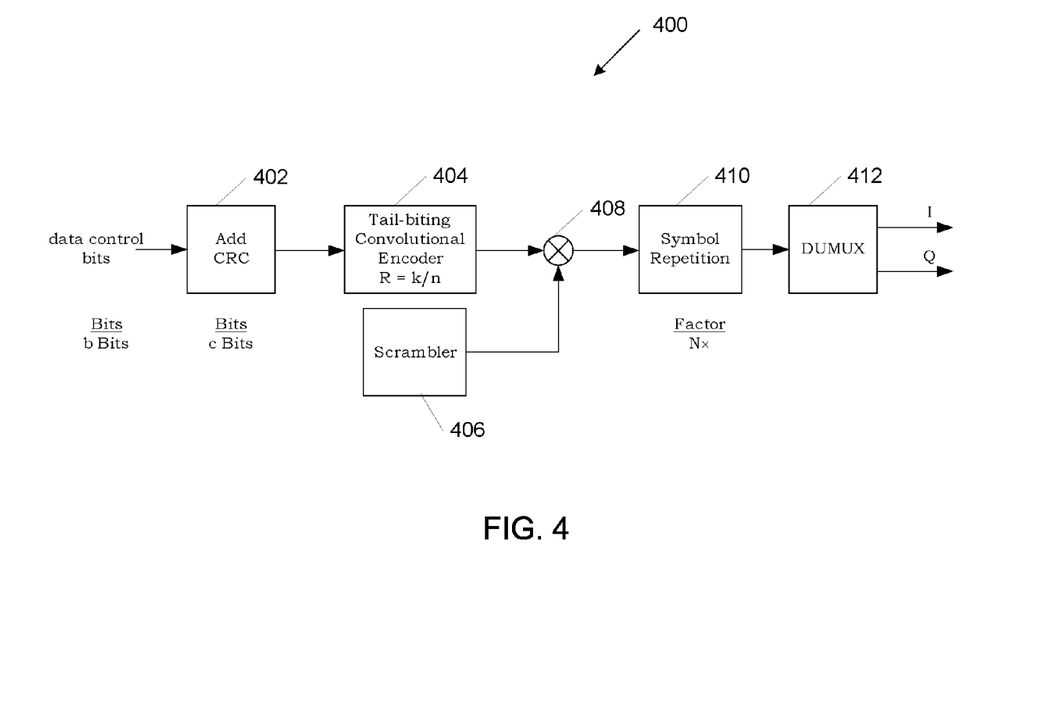
FIG. 4, is a diagram illustrating an example data control channel encoder for small transmission duration in accordance with still another embodiment.

FIG. 4 is a diagram illustrating an example data control channel encoder 400 configured in accordance with another embodiment of the systems and methods described herein. As with encoder 300, the output of tail-biting encoder 404 can be scrambled with the output of scrambling block 406. In encoder 400, the output of symbol repetition block 410 can be modulated onto both in-phase and quadrature phase signals, e.g., modulated using QPSK.

Figure 5:
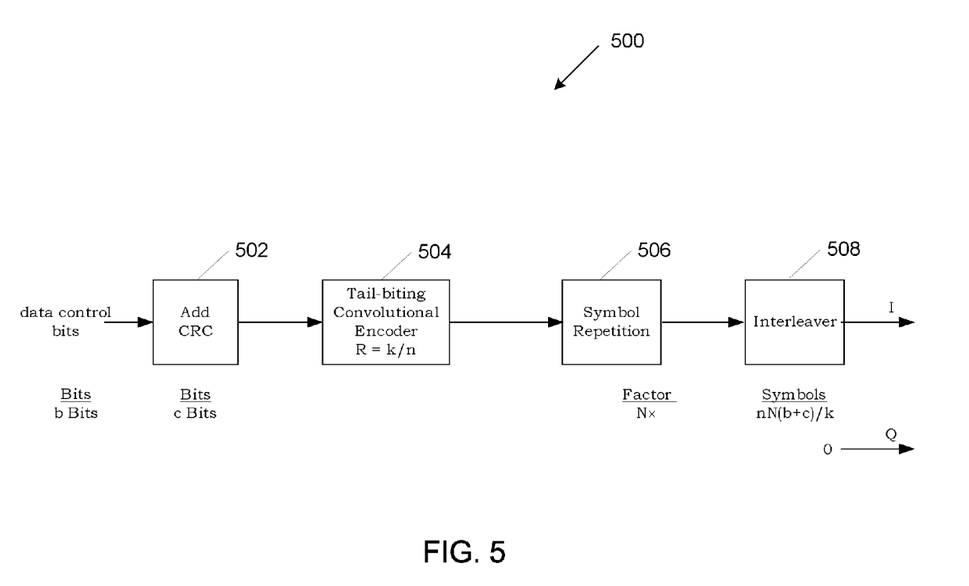
FIG. 5 is a diagram illustrating an example data control channel encoder for medium or long transmission duration in accordance with one embodiment.
Figure 6:
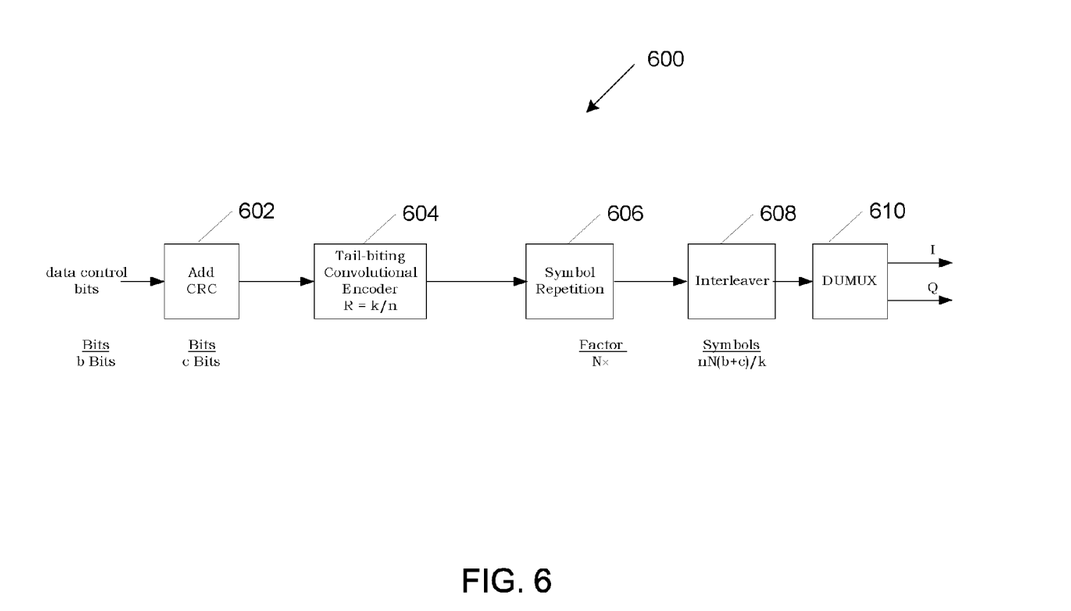
FIG. 6 is a diagram illustrating an example data control channel encoder for medium or long transmission duration in accordance with another embodiment.

Encoders 500 and 600 can be used to generate a data control channel of medium or long transmission duration, e.g., in the order of milliseconds or above. Such encoders can, for example, be used in a reverse link, or code-multiplexed or OFDM multiplexed in a forward link. In the examples of FIGS. 5 and 6, the output of symbol repetition blocks 506 and 606 are the input to interleaving blocks 508 and 608 respectively.

Interleaving is a way to arrange data in a non-contiguous way in order to increase performance. Interleaving is mainly used in digital data transmission technology to protect the transmission against burst errors. These errors overwrite a lot of bits in a row, but seldom occur. Interleaving is used to solve this problem. All data is transmitted with some control bits (independently from the interleaving), such as error correction bits that enable the channel decoder to correct a certain number of altered bits. If a burst error occurs, and more than this number of bits is altered, the codeword cannot be correctly decoded. So the bits of a number of codewords, or symbols are interleaved and then transmitted. This way, a burst error affects only a correctable number of bits in each codeword, so the decoder can decode the codewords correctly.

The output of interleaving block 508 can be modulated using BPSK, e.g., for backward compatibility, while the output of interleaving block 608 can be modulated using QPSK.

Figure 7:
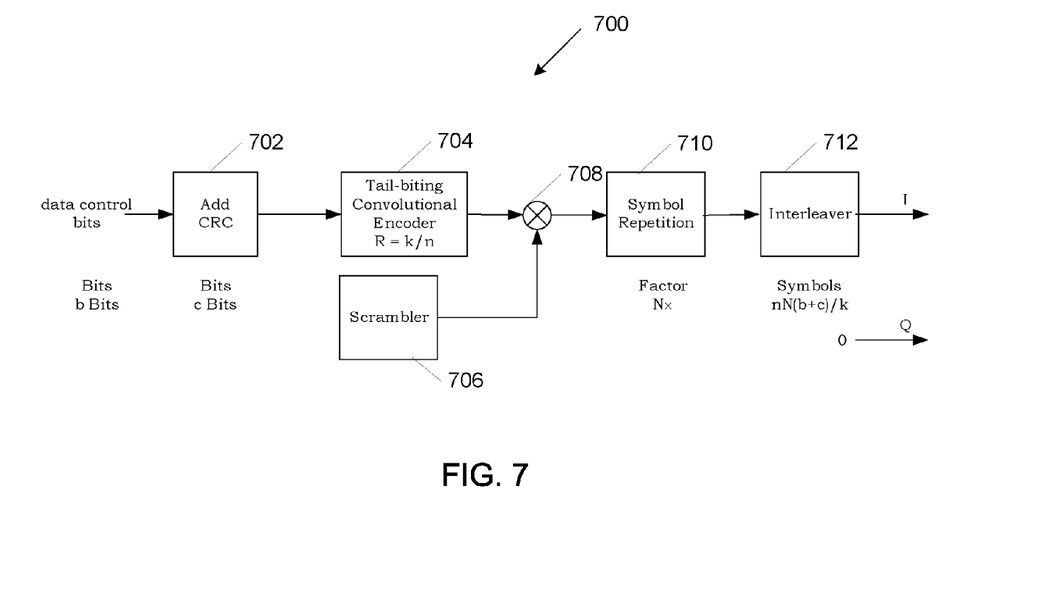
FIG. 7 is a diagram illustrating an example data control channel encoder for medium or long transmission duration in accordance with still another embodiment.
Figure 8:
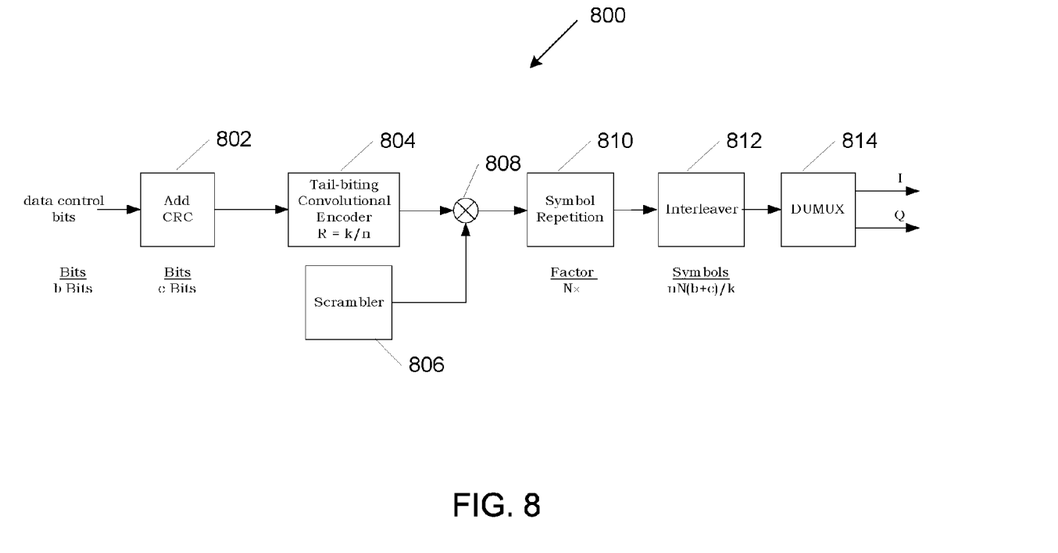
FIG. 8 is a diagram illustrating an example data control channel encoder for medium or long transmission duration in accordance with still another embodiment.

Encoders 700 and 800 can also be used to generate a data control channel of medium or long transmission duration, e.g., in the order of milliseconds or above. As can be seen, encoders 700 and 800 combine the symbol repetition, scrambling, and interleaving of the prior embodiments in a single encoder. The output of interleaving block 714 can be modulated using BPSK, e.g., for backward compatibility, while the output of interleaving block 814 can be modulated using QPSK.

Figure 9:
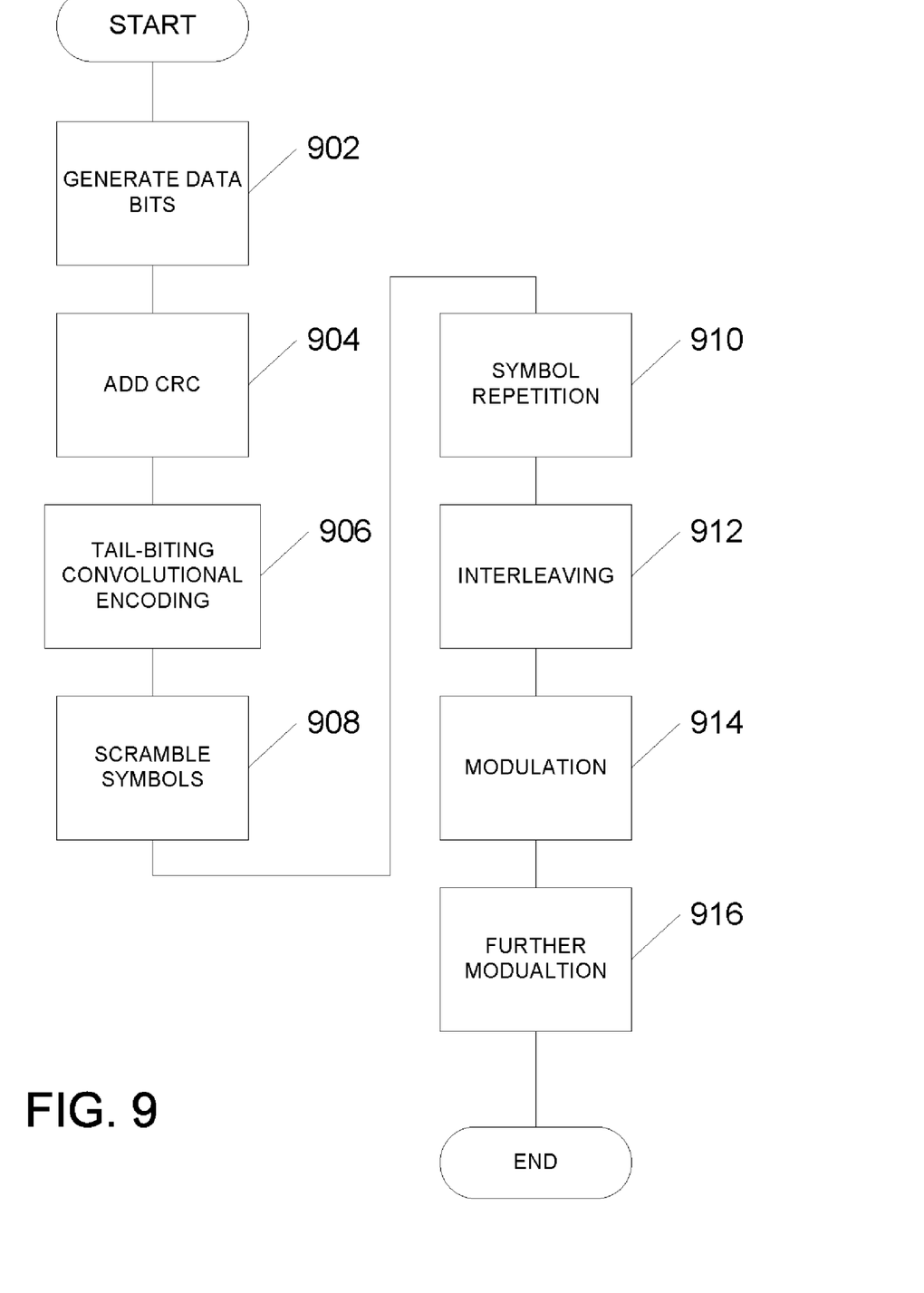
FIG. 9 is a flow chart illustrating an example method for encoding a data control channel in accordance with one embodiment.

FIG. 9 is a flow chart illustrating an example method for encoding a data channel in accordance with one embodiment of the systems and methods described herein. First, in step 902, the data bits (b) are generated and then in step 904 CRC bits (c) can be generated from, and added to the data bits (b). In step 906, the resulting input symbols can be encoding using a tail-biting convolution encoding process to generate output symbols. In certain embodiments, the output symbols can then be scrambled, or randomized in step 908.

In certain other embodiments, the output symbols can be repeated a certain number of times, e.g. repeated once for half rate (½R), three times for quarter rate (¼R), etc., in step 910. Depending on the embodiment, the output symbols can be scrambled and repeated, while in other embodiments, the output symbols can be repeated without being scrambled.

In still other embodiments, the output symbols can be interleaved in step 912. The interleaving can be in addition to scrambling and/or repetition, or the interleaving can occur without scrambling and/or repetition.

The output can then be modulated, e.g., using BPSK, QPSK, QAM, etc., in step 914. Finally, the modulated output can then be further modulated for transmission, e.g., using CDMA or OFDM, in step 916.

Figure 10:
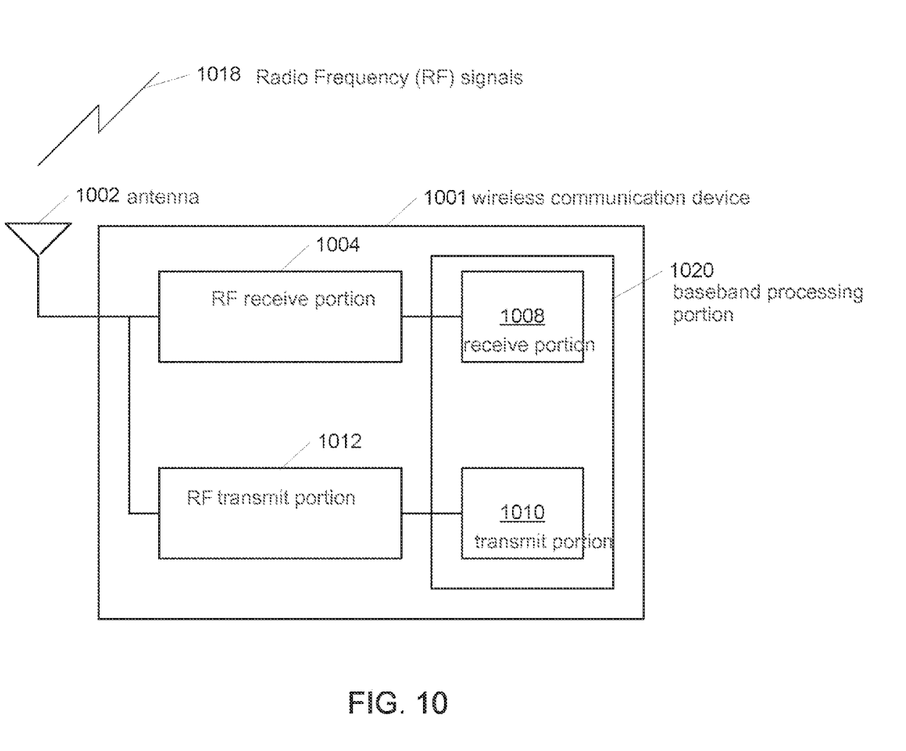
FIG. 10 is a diagram illustrating an example wireless communication device that can include the encoders of FIGS. 1-8.

FIG. 10 is a diagram illustrating a wireless communication device 1001 that can comprise a channel encoder such as those described above. As can be seen, device 1001 can comprise one or more antennas 1002 configured to transmit and receive Radio Frequency (RF) signals 1018. Device 1001 can also comprise an RF front end portion as well as a digital, or baseband processing portion 1020. The RF front end can comprise receive portion 1004 and transmit portion 1012. Receive portion 1004 can include the hardware, such as low noise amplifiers, demodulators, filters, analog digital converts, etc., required to convert received signals 1018 into information signals that can be processed by the baseband processing portion 1020. Transmit portion 1012 can comprise the hardware, such as digital to analog converters, filters, modulators, power amplifiers, etc., required to convert an information signal generated by baseband processing portion 1020 into a signal 1018 that can be transmitted via antenna 1002. It will be understood that certain components, such as the analog to digital and digital to analog converters can be included in either the RF front end or the baseband processing portion 1020 depending on the implementation.

Thus, processing portion 1020 can comprise a receive portion 1008 configured to process the information signals generated by the RF receiver portion 1004 and a transmit portion 1010 configured to generate the information signals converted into a transmit signal 1018 by RF transmit portion 1012. The encoder embodiments described above can be implemented in the baseband portion 1020, e.g., in transmit portion 1010. Alternatively, certain parts of the encoders described above can be included separately from baseband portion 1020.

It will be understood that similar components can be included in a base station or access point for implementing the encoders described above.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed:

1. A channel encoder configured to encode information bits, the channel encoder comprising:
   a cyclical redundancy check (CRC) encoding block configured to receive the information bits, generate CRC bits based on the information bits, and add the CRC bits to the information bits forming input symbols;
   a tail-biting convolution encoder coupled with the CRC encoding block, the tail-biting convolution encoder configured to generate output symbols from the input symbols using a tail biting technique, wherein the tail biting technique is configured to indicate the encoder to start encoding from the state of a plurality of tail bits;
   a symbol repetition block coupled with the tail-biting convolutional encoder, the symbol repetition block configured to repeat the output symbols; and
   a modulation block configured to modulate the repeated output symbols.

2. The channel encoder of claim 1, wherein the modulation block modulates the repeated output symbols using Bi-Phase Shift Keying (BPSK).

3. The channel encoder of claim 1, wherein the modulation block modulates the repeated output symbols using Quadrature Phase Shift Keying (QPSK).

4. The channel encoder of claim 1, further comprising a scrambling code generator and a combiner, the combiner coupled to the tail-biting convolutional encoder and the scrambling code generator and configured to scramble the output symbols using a scrambling code generated by the scrambling code generator.

5. The channel encoder of claim 1, further comprising an interleaving block coupled with the symbol repetition block, the interleaving block configured to interleave the output symbols.

6. The channel encoder of claim 1, further comprising:
   a scrambling code generator and a combiner, the combiner coupled to the tail-biting convolutional encoder and the scrambling code generator and configured to scramble the output symbols using a scrambling code generated by the scrambling code generator; and
   an interleaving block coupled with the symbol repetition block, the interleaving block configured to interleave the output symbols.

7. The channel encoder of claim 1, wherein the information bits are data control bits.

8. A method for encoding information bits, comprising:
   generating CRC bits based on the information bits;
   adding the CRC bits to the information bits forming input symbols;
   generating output symbols from the input symbols using a tail biting technique;
   repeating the output symbols; and
   modulating the output symbols, wherein the tail biting technique is configured to indicate the encoder to start encoding from the state of a plurality of tail bits.

9. The method of claim 8, wherein the modulating the output symbols comprises modulating the output symbols using Bi-Phase Shift Keying (BPSK).

10. The method of claim 8, wherein the modulating the output symbols comprises modulating the output symbols using Quadrature Phase Shift Keying (QPSK).

11. The method of claim 8, further comprising generating a scrambling code and scrambling the output symbols using a scrambling code.

12. The method of claim 8, further comprising interleaving the output symbols.

13. A wireless communication device, comprising:
   a receiver configured to receive coded signals;
   a transmitter configured to generate coded signals for transmission, the transmitter comprising a channel encoder configured to encode information bits, the channel encoder comprising:
   a cyclical redundancy check (CRC) encoding block configured to receive the information bits, generate CRC bits based on the information bits, and add the CRC bits to the information bits forming input symbols;
   a tail-biting convolution encoder coupled with the CRC encoding block, the tail-biting convolution encoder configured to generate output symbols from the input symbols using a tail biting technique, wherein the tail biting technique is configured to indicate the encoder to start encoding from the state of a plurality of tail bits;

a symbol repetition block coupled with the tail-biting convolutional encoder, the symbol repetition block configured to repeat the output symbols; and a modulation block configured to modulate the repeated output symbols.

14. The wireless communication device of claim 13, wherein the modulation block modulates the repeated output symbols using Bi-Phase Shift Keying (BPSK).

15. The wireless communication device of claim 13, wherein the modulation block modulates the repeated output symbols using Quadrature Phase Shift Keying (QPSK).

16. The wireless communication device of claim 13, wherein the channel encoder further comprises a scrambling code generator and a combiner, the combiner coupled to the tail-biting convolutional encoder and the scrambling code generator and configured to scramble the output symbols using a scrambling code generated by the scrambling code generator.

17. The wireless communication device of claim 13, wherein the channel encoder further comprises an interleaving block coupled with the symbol repetition block, the interleaving block configured to interleave the output symbols.

18. The wireless communication device of claim 13, wherein the channel encoder further comprises:

a scrambling code generator and a combiner, the combiner coupled to the tail-biting convolutional encoder and the scrambling code generator and configured to scramble the output symbols using a scrambling code generated by the scrambling code generator; and an interleaving block coupled with the symbol repetition block, the interleaving block configured to interleave the output symbols.

19. The wireless communication device of claim 13, wherein the information bits are data control bits.

20. The wireless communication device of claim 13, wherein the information bits belongs to one of the following channels:

preamble channel of cdma2000 EV-DO (Evolution Data Optimized) system;

reverse rate indicator channel of cdma2000 EV-DO system;

HS-SCCH (high-speed shared control channel) of Wideband CDMA system; and

E-DPCCH (enhanced dedicated physical control channel) of Wideband CDMA system.

* * * * *